(12) United States Patent  
Weirich

(10) Patent No.: US 7,525,259 B2
(45) Date of Patent: Apr. 28, 2009

(54) PRIMARY SIDE REGULATED POWER SUPPLY SYSTEM WITH CONSTANT CURRENT OUTPUT

(75) Inventor: Michael Weirich, Unterhaching (DE)

(73) Assignee: Fairchild Semiconductor Corporation, South Portland, ME (US)

( * ) Notice: Subject to any disclaimer, the term of this patent is extended or adjusted under 35 U.S.C. 154(b) by 389 days.

(21) Appl. No.: 11/348,700

(22) Filed: Feb. 7, 2006

(65) Prior Publication Data

US 2007/0182387 A1  Aug. 9, 2007

(51) Int. Cl.
*G05F 1/00* (2006.01)
(52) U.S. Cl. .................. 315/291; 315/224; 315/276
(58) Field of Classification Search .......... 315/209 R, 315/224, 276, 291, 307, 225, 246, 308
See application file for complete search history.

(56) References Cited

U.S. PATENT DOCUMENTS

| | | | | |
|---|---|---|---|---|
| 5,519,289 | A * | 5/1996 | Katyl et al. .................. | 315/224 |
| 6,118,228 | A * | 9/2000 | Pal .............................. | 315/307 |
| 6,480,399 | B2 * | 11/2002 | Balakrishnan et al. ........ | 363/16 |
| 6,879,498 | B2 * | 4/2005 | Balakrishnan et al. ........ | 363/16 |
| 7,312,585 | B2 * | 12/2007 | Wilhelm ....................... | 315/291 |

* cited by examiner

*Primary Examiner*—Douglas W Owens
*Assistant Examiner*—Jimmy T Vu
(74) *Attorney, Agent, or Firm*—Sidley Austin LLP

(57) ABSTRACT

According to an embodiment, a power supply system has a primary side and a secondary side. An input terminal on the primary side is operable to receive an input voltage. An output terminal on the secondary side is operable to be connected to a load for providing current thereto. Circuitry is provided which is operable to regulate the power supply system from the primary side so that the current provided to the load at the output terminal is substantially constant.

20 Claims, 3 Drawing Sheets ately developed designs for such applications, a power supply has a transformer (with primary and secondary windings) and an optocoupler device. The load (e.g., battery) is connected to the secondary winding, and the optocoupler is used to provide feedback from the secondary side for monitoring the current provided to the load. The optocoupler is a separate component, and thus its addition increases the cost of implementing the power supply. Furthermore, implementations according to previously developed designs may also use a dedicated integrated circuit (IC) device which is specially designed for the desired application (e.g., battery charger or LED ballast). Such a dedicated IC device also increases the cost of implementing the power supply.

PRIMARY SIDE REGULATED POWER SUPPLY SYSTEM WITH CONSTANT CURRENT OUTPUT

BACKGROUND

1. Field of Invention

The present invention relates to power conversion, and more particularly, to a primary side regulated power supply system with constant current output.

2. Description of Related Art

Power supplies are essential for many modern electronic devices. In some applications for a power supply, such as a battery charger or a light emitting diode (LED) ballast, the power supply should provide a constant current, as long as the load resistance is lower than a specific value. If load resistance is above this value, the output voltage needs to be constant or at least limited in value. In a typical implementation according to previously developed designs for such applications, a power supply has a transformer (with primary and secondary windings) and an optocoupler device. The load (e.g., battery) is connected to the secondary winding, and the optocoupler is used to provide feedback from the secondary side for monitoring the current provided to the load. The optocoupler is a separate component, and thus its addition increases the cost of implementing the power supply. Furthermore, implementations according to previously developed designs may also use a dedicated integrated circuit (IC) device which is specially designed for the desired application (e.g., battery charger or LED ballast). Such a dedicated IC device also increases the cost of implementing the power supply.

SUMMARY

One embodiment of the present invention provides a constant current output (e.g., for use in a battery charger or LED ballast) without a feedback loop from secondary side to primary side of a transformer. This is advantageous for low cost applications.

According to an embodiment of the present invention, a power supply system includes an input terminal operable to receive an input voltage. A transformer is coupled to the input terminal and defines a primary side and a secondary side. An output terminal is coupled to the secondary side of the transformer and is connectable to a load for providing current thereto. Means are provided for regulating the power supply system from the primary side so that the current provided to the load at the output terminal is substantially constant.

According to another embodiment of the present invention, a power supply system includes an input terminal operable to receive an input voltage. A transformer is coupled to the input terminal and defines a primary side and a secondary side. An output terminal is coupled to the secondary side of the transformer and is connectable to a load for providing current thereto. A control circuit is coupled to the transformer and operable to control current flowing through the transformer. A feedback circuit, coupled to the control circuit and the transformer, is operable to support regulation by the control circuit from the primary side so that the current provided to the load at the output terminal is substantially constant.

According to yet another embodiment of the present invention, a power supply system has a primary side and a secondary side. An input terminal on the primary side is operable to receive an input voltage. An output terminal on the secondary side is operable to be connected to a load for providing current thereto. Circuitry is provided which is operable to regulate the power supply system from the primary side so that the current provided to the load at the output terminal is substantially constant.

Important technical advantages of the present invention are readily apparent to one skilled in the art from the following figures, descriptions, and claims.

BRIEF DESCRIPTION OF DRAWINGS

For a more complete understanding of the present invention and for further features and advantages, reference is now made to the following description taken in conjunction with the accompanying drawings.

DETAILED DESCRIPTION

Figure 1:
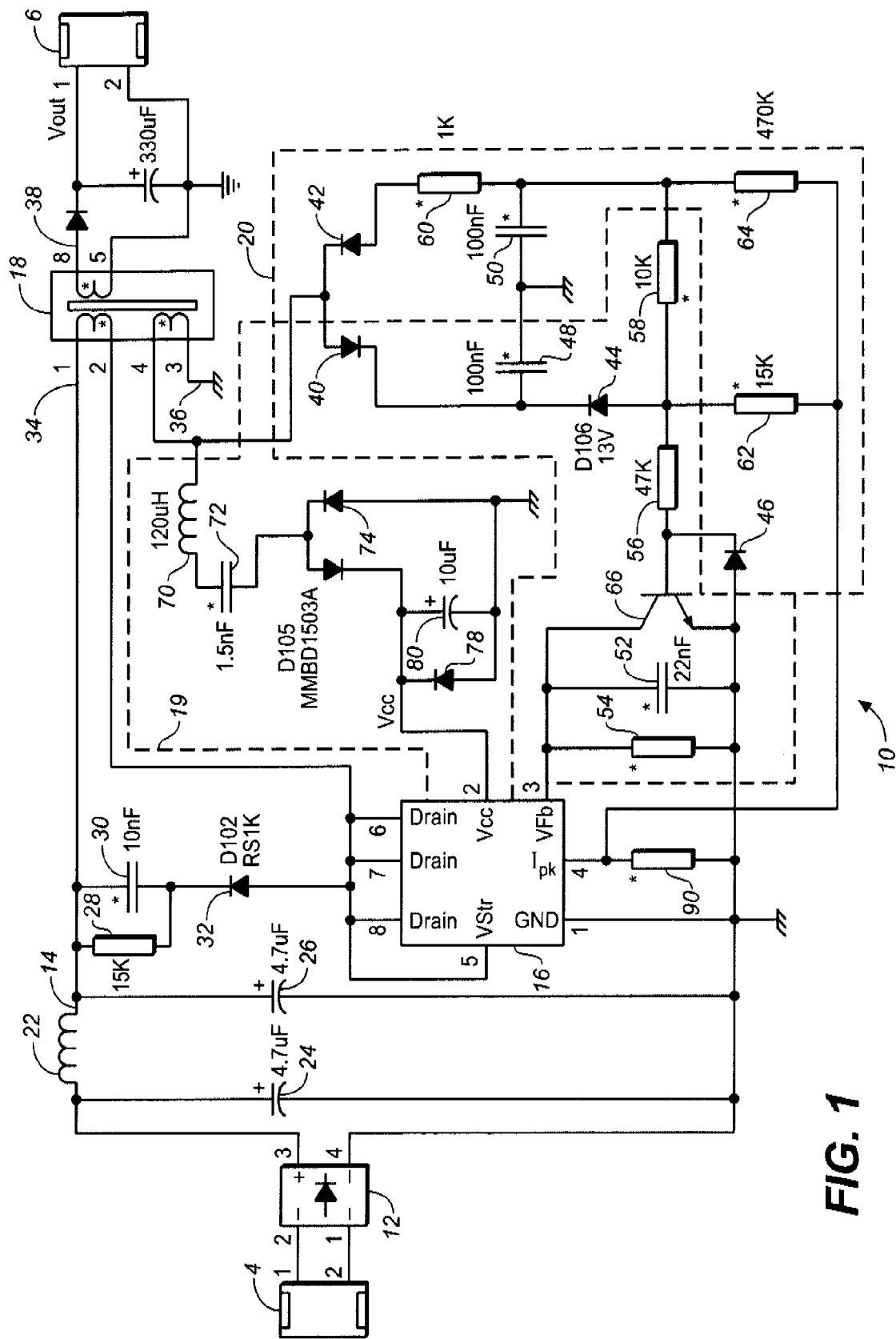
FIG. 1 is a schematic diagram in partial block form of a power supply system, according to an embodiment of the invention.
Figure 2:
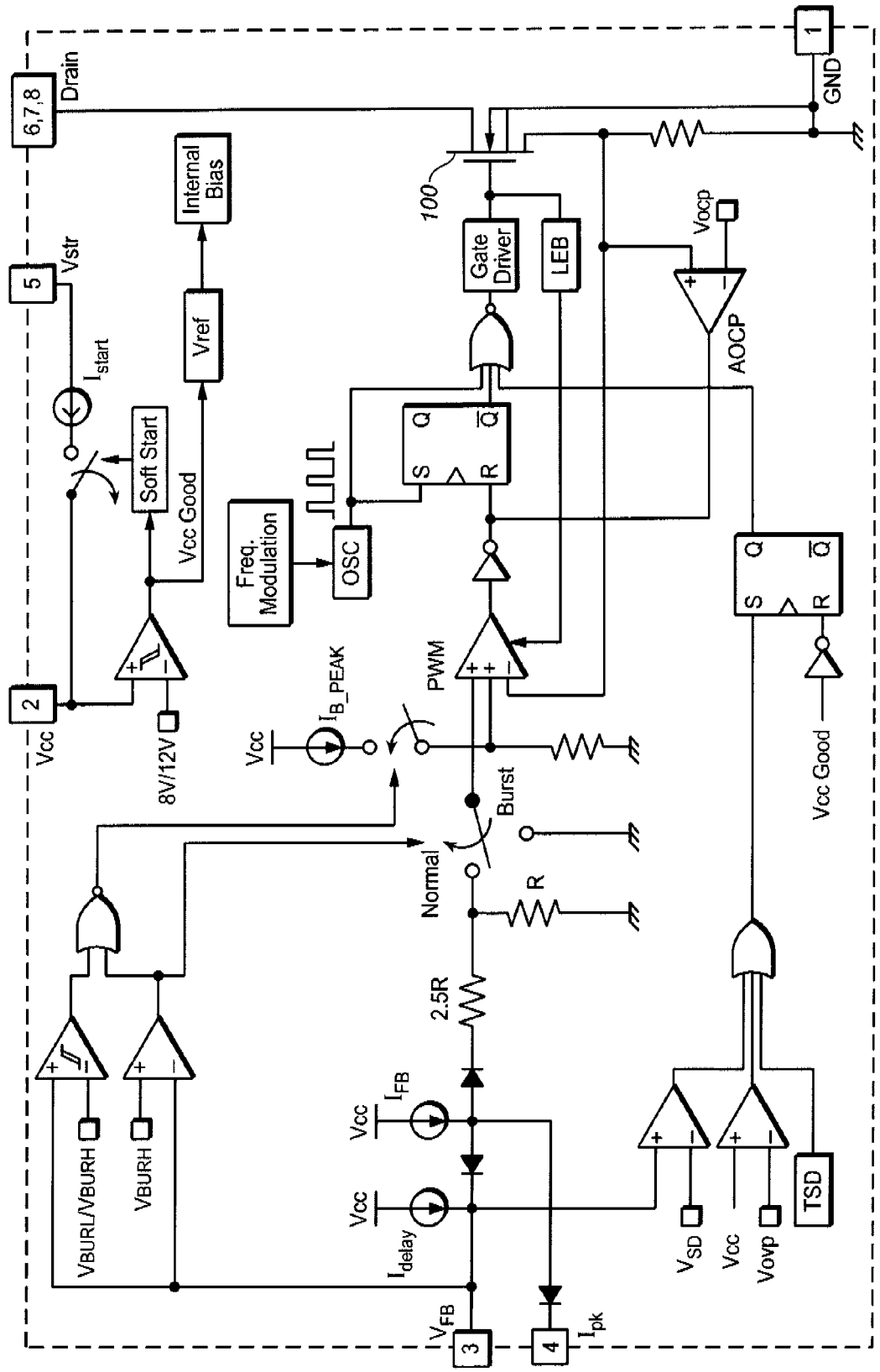
FIG. 2 is a schematic diagram in partial block form of an exemplary implementation for a control circuit depicted in FIG. 1.
Figure 3:
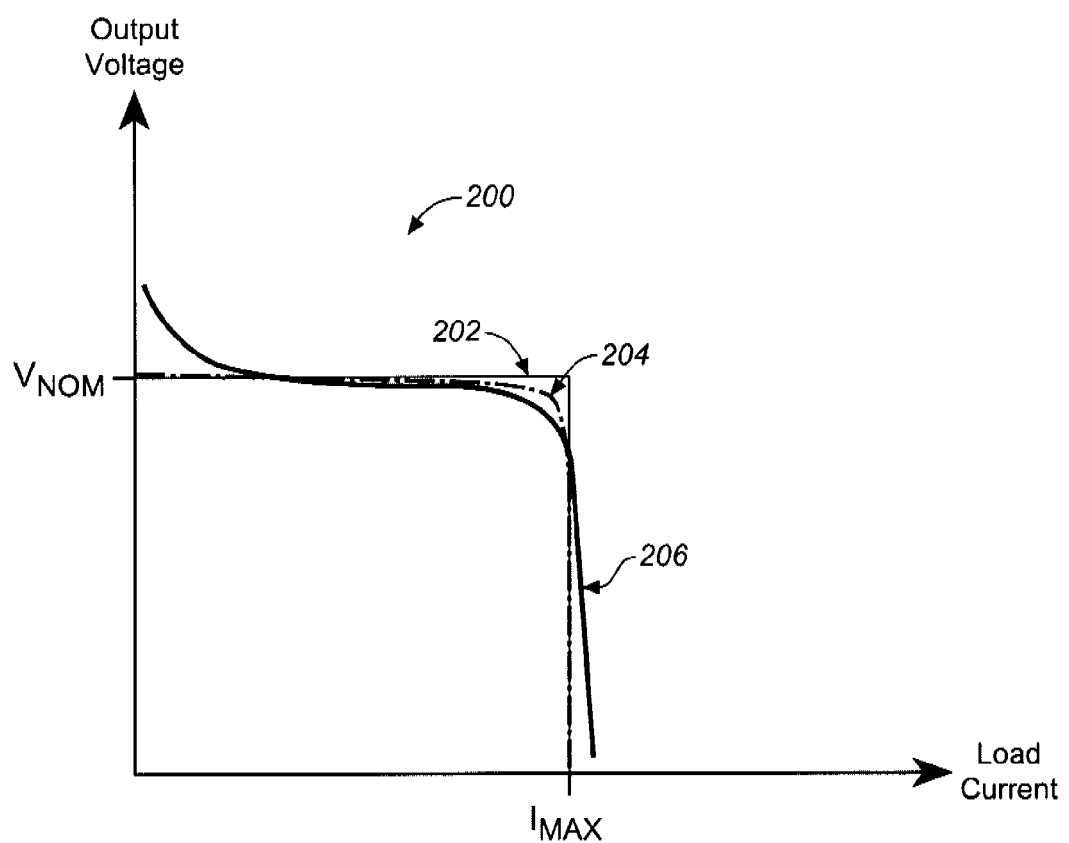
FIG. 3 is a diagram comparing the output characteristics of a power supply system having primary side regulation according to an embodiment of the invention and a supply implemented according to a previously developed technique.

Embodiments of the present invention and their advantages are best understood by referring to FIGS. 1 through 3 of the drawings. Like numerals are used for like and corresponding parts of the various drawings.

FIG. 1 is a schematic diagram in partial block form of a power supply system 10, according to an embodiment of the invention. Power supply system 10 can be connected to an input voltage source 4 and is used to provide a constant current output to a load 6 (e.g., a battery), using primary side current and voltage regulation. Power supply system 10 outputs a voltage Vout. As depicted, power supply system 10 includes a rectifier circuit 12, an incoming LC filter network 14, an RC network 15, a control circuit 16, a transformer 18, an auxiliary supply circuit 19, and a feedback circuit 20.

Input voltage source 4 can be a source of alternating current (AC) mains voltage. Rectifier circuit 12 functions to rectify the AC input voltage to produce a direct current (DC) voltage. Rectifier circuit 12 can be implemented with a plurality of diodes arranged in a full-wave rectifier configuration. In one embodiment, as shown, the incoming LC filter network 14 comprises inductor 22 and capacitors 24, 26. In one embodiment, each of capacitors 24, 26 may have a value of 4.7 µF. Transformer 18 may be connected to the RC network 15. RC network 15 limits voltage spikes due to the leakage inductance of transformer 18. RC network 15 may comprise a resistor 28 and capacitor 30. In one embodiment, resistor 28 may have a value of 15 KΩ and capacitor 30 may have a value of 10 nF. Transformer 18 has windings 34, 36 on the primary side and a winding 38 on the secondary side.

Control circuit 16 may be connected to the RC network 15 and transformer 18. Control circuit 16 controls current flow through power supply system 10, and thus the current delivered to load 6. Control circuit 16 may comprise a power switch having a terminal which is connected to winding 34 of transformer 18. The power switch can be turned on and off for causing current to flow through winding 34. The control circuit 16 may also have terminals for feedback voltage (Vfb) for limiting peak drain current (Ipk).

In some embodiments, all or a part of control circuit 16 may be implemented on one or more suitable integrated circuit (IC) devices with current control and current limiting features. Such IC devices do not need to be specially designed for a desired applications such as battery chargers or LED ballasts like previous designs. In one embodiment, for example, control circuit 16 may be implemented with a FSDX321 product, which is commercially available from Fairchild Semiconductor Corporation. A schematic diagram, in partial block form, for one implementation of control circuit 16 is shown FIG. 2.

A resistor 90, connected to the Ipk terminal of control circuit 16, sets the limit for the peak drain current (Ipk). That is, resistor 90 determines the output limit current on the primary side of transformer 18, thus limiting the power on the secondary side.

Auxiliary power supply circuit 19 can be connected to winding 36 on the primary side of transformer 18. When current flows through primary winding 36, auxiliary power supply circuit 19 provides power (Vcc) to control circuit 16. As depicted, supply circuit 19 includes an inductor 70, capacitors 72, 80, and diodes 74, 76, and 78. In one embodiment, inductor 70 has a value of 120 μH; and capacitors 72 and 80 have values of 1.5 nF and 10 μF, respectively.

Feedback circuit 20 provides feedback (Vfb) to control circuit 16 for regulation of system 10 from the primary side. As shown, in one embodiment, feedback circuit 20 comprises diodes 40, 42, 44, 46, capacitors 48, 50, 52, resistors 54, 56, 58, 60, 62, 64, and transistor 66. In one embodiment, each of capacitors 48 and 50 may have a value of 100 nF, and capacitor 52 may have a value of 22 nF; resistors 56, 58, 60, 62, 64, and 66 may have values of 47 KΩ, 10 KΩ, 1 KΩ, 15 KΩ, and 470 KΩ, respectively. One part of feedback circuit 20 is associated with a steady-state condition of power supply system 10 until the output voltage Vout begins to drop; another part of feedback circuit 20 is used to enable or provide a constant output current for system 10 after the output voltage Vout has begun to drop.

The part of feedback circuit 20 which is associated with the steady-state condition of power supply system 10 includes diode 40, capacitor 48, diode 44, resistors 56, 58, transistor 66, and capacitor 52. These components provide output voltage regulation. In steady state condition and with light load, the output voltage Vout of system 10 is stable, and a current is provided to the load 6. In feedback circuit 20, the voltage (Vc) across capacitor 48 is a function of the base-emitter voltage (Vbe) of transistor 66 and the voltage drop (Vz) across diode 44, as given by the following equation: Vc=Vbe+Vz. Transistor 66, which in one embodiment can be implemented as a bipolar junction transistor (BJT), modulates the feedback voltage.

With an increase in the load 6 for power supply system 10, the output voltage Vout decreases, which in turn causes the flyback voltage across primary winding 36 of transformer 18 to decrease. This causes the voltage (Vc) across capacitor 48, and in turn base-emitter voltage (Vbe) of transistor 66, to decrease since the voltage drop (Vz) across diode 44 is constant. When Vbe decreases, the current through the collector of the transistor 66 decreases. This has the effect of the voltage (Vfb) increasing. As a result of this, the drain current of the control circuit 16 is increased and the output voltage increases. This operation continues until the drain current of control circuit 16 reaches the current limit set by resistor 90.

At this point, the peak current through the power switch of the control circuit 16 remains constant regardless of the voltage (Vfb) at the feedback terminal of the control circuit 16. This results in a decrease of output voltage Vout. Because the voltage/current (V/I) characteristic of the output under this condition is essentially a constant power characteristic (i.e., Iout=a/Vout, where a is some constant), the load current would increase.

To avoid this increase in the load current, the other part of feedback circuit 20 is active to enable or provide a constant output current for system 10 after the output voltage Vout has begun to drop. This part of feedback circuit 20 includes diode 42, resistor 60, capacitor 50, and resistors 62, 64, and essentially functions to lower the peak drain current through the power switch of the control circuit. This part of feedback circuit 20 may work as follows.

The forward voltage across winding 36 on the primary side of transformer 18 is rectified and filtered by diode 42, resistor 60, and capacitor 50. The resulting voltage across capacitor 50 is negative with respect to signal ground (GND) and proportional to the input voltage of the power supply system 10. After the peak drain current limit set by resistor 90 connected to terminal (Ipk) of the control circuit 16 is reached, and as the load increases and the output voltage Vout starts to drop, the voltage at the cathode of diode 44 starts to drop. This is because the voltage at the cathode of diode 44 is equal to Vc−Vz, where Vc is voltage across capacitor 48 and Vz is the voltage drop across diode 44. At a certain point, current starts to flow through resistor 62 out of the Ipk terminal of control circuit 16 through diode 44, further lowering peak drain current. This establishes a feedback loop stabilizing the output current to the load so taht is not increasing. The amount of feedback (and thus the desired output characteristic for power supply system 10) can be set by the value of resistor 62. Furthermore, a foldback characteristic is possible with some embodiments. Resistor 64 compensates for the rising drain current limit with rising input voltage.

Power supply system 10 can be used, for example, in low cost battery charger applications or for LED ballast. Power supply system 10 can be implemented with fewer, and less expensive components than many previous designs.

Power supply system 10 provides a constant output current to load 6, when the load voltage is lower than a certain value, using primary side regulation. As such, power supply system 10 does not require an optocoupler for feedback from the secondary side of transformer 28. This reduces the cost of implementation, thus providing significant advantages.

FIG. 2 is a schematic diagram in partial block form of an exemplary implementation for a control circuit 16 depicted in FIG. 1. In some embodiments, all or a part of control circuit 16 may be implemented on one or more integrated circuit (IC) devices. As depicted, control circuit 16 has terminals, leads, or pins for normal operating voltage (Vcc), startup voltage (Vstr), ground (GND), feedback voltage (Vfb), peak current (Ipk), and output (Drain). Control circuit 16 comprises a power switch 100, which may be implemented with a metal-oxide-semiconductor field effect transistor (MOSFET), a bipolar junction transistor (BJT), insulated-gate bipolar transistor (IGBT), or any other suitable transistor. The output terminal (Drain) of control circuit 16 may be connected to winding 34 of transformer 18. The power switch 100 of control circuit 16 is driven to control current flow through winding 34 of transformer 18, and thus the current delivered to load 6.

FIG. 3 is a diagram 200 comparing the output characteristics of a power supply system having primary side regulation according to an embodiment of the invention and a supply implemented according to a previously developed technique. Diagram 200 depicts a number of voltage/current (V/I) characteristic curves 202, 204, and 206. Curve 202 is an ideal characteristic curve a power supply that provides constant current to a load for a range of output voltage values. Curve 204 is the characteristic curve for a power supply using an optocoupler according to previously developed techniques. Curve 206 is the characteristic curve for a power supply having primary side regulation according to an embodiment of the invention. As shown in FIG. 3, the power supply according to an embodiment of the invention provides performance comparable to previously developed techniques (with near-ideal characteristics), but without the use of an optocoupler, thus providing a savings in implementation costs.

Some advantages offered by various embodiments of the present invention include reducing the number of parts and the cost of implementing a low power charger. This can also improve reliability of the implementation. Furthermore, no specialized parts or integrated circuits are necessary.

Although the present invention and its advantages have been described in detail, it should be understood that various changes, substitutions, and alterations can be made therein without departing from the spirit and scope of the invention as defined by the appended claims. That is, the discussion included in this application is intended to serve as a basic description. It should be understood that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Neither the description nor the terminology is intended to limit the scope of the claims.

What is claimed is:

1. A power supply system comprising:
   an input terminal operable to receive an input voltage;
   a transformer coupled to the input terminal and defining a primary side and a secondary side;
   an output terminal coupled to the secondary side of the transformer and connectable to a load for providing current thereto; and
   means for regulating the power supply system from the primary side so that the current provided to the load at the output terminal is substantially constant, wherein the means for regulating comprises:
      a control circuit having a power switch through which drain current flows; and
      the feedback circuit coupled to the control circuit;
      wherein the control circuit and the feedback circuit are operable to regulate a voltage at the output terminal in a steady-state operation of the power supply system and further operable to provide a constant current output to the load when a voltage at the output terminal is lower than a certain value;
   wherein the transformer comprises a first and second primary side winding and a secondary side winding, wherein the power switch of the control circuit is coupled to the first primary side winding, and wherein the output terminal is coupled to the secondary side winding.

2. The power supply system of claim 1 wherein the feedback circuit comprises a resistor coupled to the control circuit through which current may flow to reduce the drain current flowing through the power switch in the control circuit.

3. The power supply system of claim 1 wherein the feedback circuit comprises a resistor coupled to the control circuit to adjust the drain current flowing through the power switch in the control circuit.

4. The power supply system of claim 1 wherein the feedback circuit is coupled to the second primary side winding.

5. The power supply system of claim 1 wherein the feedback circuit comprises:
   a first diode couple at its anode to the second primary side winding;
   a capacitor coupled to a cathode of the first diode;
   a second diode coupled at its cathode to the cathode of the first diode;
   a resistor coupled at one end to an anode of the second diode and at another end to a control terminal of a transistor; and
   the transistor coupled to the control circuit.

6. The power supply system of claim 1 wherein at least a portion of the control circuit is implemented as an integrated circuit device.

7. A power supply system comprising:
   an input terminal operable to receive an input voltage;
   a transformer coupled to the input terminal and defining a primary side and a secondary side;
   an output terminal coupled to the secondary side of the transformer and connectable to a load for providing current thereto; and
   means for regulating the power supply system from the primary side so that the current provided to the load at the output terminal is substantially constant, wherein the means for regulating comprises:
      a control circuit having a power switch through which drain current flows; and
      the feedback circuit coupled to the control circuit;
      wherein the control circuit has a feedback terminal and a peak drain current terminal, and wherein the feedback circuit is coupled to the feedback terminal and the peak drain current terminal of the control circuit;
      wherein the control circuit and the feedback circuit are operable to regulate a voltage at the output terminal in a steady-state operation of the power supply system and further operable to provide a constant current output to the load when a voltage at the output terminal is lower than a certain value.

8. A power supply system comprising:
   an input trminal operable to receive an input voltage;
   a transformer coupled to the input terminal and defining a primary side and a secondary side;
   an output terminal coupled to the secondary side of the transformer and connectable to a load for providing current thereto;
   a control circuit coupled to the transformer and operable to control current flowing through the transformer, wherein the control circuit comprises a power switch through which drain current flows; and
   a feedback circuit coupled to the control circuit and the transformer, the feedback circuit operable to support regulation by the control circuit from the primary side so that the current provided to the load at the output terminal is substantially constant;
   wherein the transformer comprises a first and second primary side winding and a secondary side winding, wherein the power switch of the control circuit is coupled to the first primary side winding, and wherein the output terminal is coupled to the secondary side winding.

9. The power supply system of claim 8 wherein the feedback circuit comprises a resistor coupled to the control circuit through which current may flow to reduce the drain current flowing through the power switch in the control circuit.

10. The power supply system of claim 8 wherein the feedback circuit is coupled to the second primary side winding.

11. The power supply system of claim 8 wherein at least a portion of the control circuit is implemented as an integrated circuit device.

12. The power supply system of claim 8 wherein the feedback circuit comprises a resistor coupled to the control circuit to adjust current flowing through the control circuit.

13. A power supply system comprising:
an input terminal operable to receive an input voltage;
a transformer coupled to the input terminal and defining a primary side and a secondary side;
an output terminal coupled to the secondary side of the transformer and connectable to a load for providing current thereto;
a control circuit coupled to the transformer and operable to control current flowing through the transformer, wherein the control circuit comprises a power switch through which drain current flows; and
a feedback circuit coupled to the control circuit and the transformer, the feedback circuit operable to support regulation by the control circuit from the primary side so that the current provided to the load at the output terminal is substantially constant;
wherein the transformer comprises a first and second primary side winding and a secondary side winding, wherein the power switch of the control circuit is coupled to the first primary side winding, and wherein the output terminal is coupled to the secondary side winding.

14. The power supply system of claim 13 wherein the feedback circuit is coupled to the second primary side winding of the transformer.

15. The power supply system of claim 13 wherein the feedback circuit comprises:
a first diode couple at its anode to the second primary side winding;
a capacitor coupled to a cathode of the first diode;
a second diode coupled at its cathode to the cathode of the first diode;
a resistor coupled at one end to an anode of the second diode and at another end to a control terminal of a transistor; and
the transistor coupled to the control circuit.

16. A power supply system comprising:
an input terminal operable to receive an input voltage;
a transformer coupled to the input terminal and defining a primary side and a secondary side;
an output terminal coupled to the secondary side of the transformer and connectable to a load for providing current thereto;
a control circuit coupled to the transformer and operable to control current flowing through the transformer, wherein the control circuit comprises a power switch through which drain current flows; and
a feedback circuit coupled to the control circuit and the transformer, the feedback circuit operable to support regulation by the control circuit from the primary side so that the current provided to the load at the output terminal is substantially constant;
wherein the control circuit has a feedback terminal and a peak drain current terminal, and wherein the feedback circuit is coupled to the feedback terminal and the peak drain current terminal of the control circuit.

17. A power supply system having a primary side and a secondary side, the system comprising:
an input terminal on the primary side operable to receive an input voltage;
an output terminal on the secondary side operable to be connected to a load for providing current thereto; and
circuitry operable to regulate the power supply system from the primary side so that the current provided to the load at the output terminal is substantially constant, wherein the circuitry comprising:
a control circuit having a power switch through which drain current flows; and
the feedback circuit coupled to the control circuit;
wherein the control circuit and the feedback circuit are operable to regulate a voltage at the output terminal in a steady-state operation of the power supply system and further operable to provide a constant current output to the load when a voltage at the output terminal is lower than a certain value;
wherein the control circuit has a feedback terminal and a peak drain current terminal, and wherein the feedback circuit is coupled to the feedback terminal and the peak drain current terminal of the control circuit.

18. The power supply system of claim 17 wherein the feedback circuit comprises a resistor coupled to the control circuit through which current may flow to reduce the drain current flowing through the power switch in the control circuit.

19. The power supply system of claim 17 wherein the feedback circuit comprises a resistor coupled to the control circuit to adjust the drain current flowing through the power switch in the control circuit.

20. The power supply system of claim 17 wherein at least a portion of the control circuit is implemented as an integrated circuit device.

* * * * *